Patented May 17, 1949

2,470,417

UNITED STATES PATENT OFFICE 2,470,417

EMULSION POLYMERIZATION IN THE PRESENCE OF SELECTIVELY HYDROGENATED TALLOW SOAPS

Byron M. Vanderbilt, Westfield, and John D. Hetchler, Rutherford, N. J.; said Vanderbilt assignor to Standard Oil Development Company, a corporation of Delaware, and said Hetchler assignor to Archer-Daniels-Midland Company, Minneapolis, Minn., a corporation of Delaware No Drawing. Application December 30, 1944, Serial No. 570,749

10 Claims. (Cl. 260—84.5)

The present invention pertains to the manufacture of synthetic rubber-like materials and in particular to the preparation of such materials by emulsion polymerization.

Synthetic rubber-like materials have been prepared by polymerizing one or more conjugated diolefins or by interpolymerizing one or more conjugated diolefins with copolymerizable materials containing a single C=C group such as styrene, substituted styrenes, acrylonitrile, methacrylonitrile, acrylic acid esters, unsaturated ketones and the like in aqueous emulsion using a compound capable of liberating oxygen under the reaction conditions such as hydrogen peroxide, benzoyl peroxide and alkali metal or ammonium persulfates and perborates as catalysts.

The reactants are emulsified in from an equal to a two-fold quantity of water using as the emulsifier water-soluble soaps such as alkali metal or ammonium oleates and stearates, as well as various surface active agents such as salts of alkylated naphthalene sulfonic acids, fatty alcohol sulfates, aliphatic and olefinic sulfonic acids and also acid addition salts of high molecular alkyl amines. In spite of its shortcomings, soap is most generally used as the emulsifier since it is cheaper and in general gives more processable products than are obtainable with the other surface active materials listed above.

The first prerequisite for any soap to be satisfactory as an emulsifier for any given emulsion polymerization system is that it be sufficiently soluble at the temperature employed to result in a stable emulsion and one which is sufficiently fluid that it can be handled readily. Soaps of high melting saturated fatty acids such as sodium stearate and sodium palmitate are not sufficiently soluble in water to be applicable as emulsifiers for polymerizations carried out at temperatures below about 50° C. Proper solubility characteristics can be obtained by using the potassium salt rather than the sodium salt of palmitic or stearic acid. This has not proved satisfactory since it is expensive because of the high cost of potash as compared to soda. Moreover, stearic acid is more expensive than mixed acids obtained directly from a fat such as tallow. Furthermore, in a polymerization system such as that of butadiene and acrylonitrile it is difficult to make a pH adjustment within the optimum range of about 8.0-8.5 when using high melting fatty acids such as stearic or palmitic acids.

It is the object of this invention to provide the art with a method of preparing emulsion polymerizates using novel soap type emulsifiers.

It is also the object of this invention to prepare emulsion polymerizates of diolefins and mixtures of diolefins with copolymerizable materials using novel soap type emulsifiers which do not have the detrimental effect on emulsion polymerization systems and emulsion polymerization products that previously used soap type emulsifiers have.

It is also an object of this invention to provide new soap type emulsifiers for the preparation of synthetic rubber-like materials.

These and other objects will appear more clearly from the detailed description and the claims which follow.

It has now been found that the water-soluble soaps prepared from the mixture of fatty acids obtained by the partial hydrogenation of the acids from tallow are highly effective as emulsifiers for the preparation of emulsion polymerizates from diolefins or mixtures of diolefins with copolymerizable materials. These soaps have most of the advantages of a soap of a saturated fatty acid such as stearic or palmitic acid and still the sodium salt is sufficiently soluble to allow polymerizations of the butadiene-acrylonitrile type to be carried out as low as 25° C. or even lower.

The mixture of fatty acids which may use comprises the following acids:

|  | Percent |
|---|---|
| Myristoleic | 0.0– 1.0 |
| Myristic | 0.0– 4.0 |
| Palmitoleic | 4.0–10.0 |
| Palmitic | 20.0–35.0 |
| Oleic | 35.0–45.0 |
| Linoleic | 0.0– 0.5 |
| Stearic | 20.0–30.0 |

This represents about the range of composition of acid mixtures obtained for example by hydrolyzing beef tallow, distilling to purify the acid mixture and selectively hydrogenating the mixture of acids. Acids of this composition are preferred for our purposes since they are readily prepared from tallow. It is possible however to alter the composition of the acid mixture without materially altering its desirable properties. For example, lauric and/or myristic acids may be added to bring the combined total of these acids up to about 30% of the mixture and stearic acid may be replaced by palmitic acid. The range of composition of the acid mixture which may be used in accordance with the present invention is as follows:

| | Percent |
|---|---|
| Lauric and myristic | 0.0–30.0 |
| Myristoleic | 0.0– 1.0 |
| Palmitoleic | 4.0–10.0 |
| Palmitic and Stearic | 40.0–65.0 |
| Oleic | 35.0–45.0 |
| Linoleic | 0.0– 0.5 |

The critical features of the acid mixtures used in accordance with the present invention are (1) substantial freedom from polyolefinic fatty acids, (2) a titer below 45° C. and (3) a preponderance of saturated fatty acids over monoolefinic fatty acids.

As indicated above we prefer to prepare our acid mixtures from tallow. This may be done by subjecting the tallow to hydrolysis to liberate the fatty acids therein and subjecting the fatty acids to distillation to separate the acids from unsaponified or unsaponifiable materials or other impurities. The purified acid mixture obtained in this way from high grade beef tallow has approximately the following analysis:

| | Per cent |
|---|---|
| Myristoleic acid | 0.5 |
| Myristic acid | 3.0 |
| Palmitoleic acid | 7.4 |
| Palmitic acid | 26.0 |
| Oleic acid | 40.0 |
| Linoleic acid | 2.5 |
| Stearic acid | 20.6 |
| | 100.0 |
| Titer ° C | 42 |
| Free fatty acid per cent | [1] 100 |
| Iodine No | 56.0 |
| Acid No | 200.0 |

[1] Based as oleic acid.

This acid mixture is then subjected to a selective hydrogenation treatment in order to remove all or a major proportion of the polyolefinic acids (reported as linoleic acid in the above analysis) that are present in the acid mixture as well as peroxides or other impurities which are harmful to the polymerization. This selective hydrogenation may be carried out at temperatures between 250 and 350° F., preferably at 280–300° F. under hydrogen pressures of up to about 80 lbs./sq. in., preferably at 18–20 lbs./sq. in. hydrogen pressure and in the presence of from 0.05 to 0.2% of a nickel catalyst. The analysis of the above described acid mixture after undergoing this selective hydrogenation is approximately as follows:

| | Per cent |
|---|---|
| Myristoleic acid | 0.5 |
| Myristic acid | 3.0 |
| Palmitoleic acid | 7.0 |
| Palmitic acid | 26.4 |
| Oleic acid | 39.0 |
| Linoleic acid | 0.5 |
| Stearic acid | 23.6 |
| | 100.0 |
| Titer ° C | 42.8 |
| Free fatty acid per cent | [1] 101.4 |
| Iodine No | 48.9 |
| Acid No | 201.5 |

[1] Based as oleic acid.

It may be observed that the principal change in the acid composition is to drastically reduce the linoleic acid content and to increase the stearic acid concentration. However, we do not wish to postulate that this is the sole reason for the improvement obtained when hydrogenating. It is known that many bodies which are harmful to emulsion polymerization, even when present in traces, are destroyed by hydrogen in the presence of catalysts.

Instead of preparing the acid mixtures by hydrolyzing, distilling and then hydrogenating, they may be prepared by hydrogenating the tallow, then hydrolyzing and distilling, or the tallow may be hydrolyzed, hydrogenated and then subjected to distillation. The important point in the preparation of the acid mixture for use in accordance with the present invention is reduction of polyolefinic acids such as linoleic and linolinic acids to oleic or to stearic acid in order that the amount of polyolefinic acid does not exceed 0.5% and the avoidance of conversion of oleic acid to stearic acid which would cause a marked increase in the titer of the acid mixture.

While for economic reasons it is preferred to use the sodium salt of these acid mixtures, use of the potassium salt is beneficial when it is desired to carry out emulsion polymerizations below about 25° C. It is also within the scope of this invention to use other water-soluble salts of the acid mixtures such as the ammonium and certain organic amine salts such as that of N-diethylaminoethanol. The soaps in accordance with this invention are ordinarily used in amounts of from about 1 to 4% based upon the water phase.

Use of the fatty acid mixtures in accordance with the present invention has proven to be particularly advantageous when carrying out emulsion polymerizations in which a considerable proportion of the fatty acid is present as the free acid. This is the case, for example, when copolymerizing butadiene and acrylonitrile in an emulsion having a pH range of 8.0–8.5. In order to get the desired pH the fatty acid should preferably not melt more than 15 to 20° C. higher than the temperature at which the polymerization is carried out. Furthermore, the polyolefinic acids appear to have a greater detrimental effect upon the polymerization when a part of the acid is not tied up in the form of soap. Since our acid mixtures have a titer below 45° C. and are substantially free from polyolefinic fatty acids they readily lend themselves to use in polymerization reactions carried out at temperatures of around 20–25° C. and in the presence of substantial proportions of free fatty acids.

The soaps in accordance with the present invention are applicable to the emulsion polymerization of conjugated diolefins generally, either taken singly or in mixtures, to the copolymerization of conjugated diolefins with compounds containing a single C=C linkage and capable of forming copolymerizates with conjugated diolefins in aqueous emulsion, as well as to the polymerization of vinyl type compounds such as styrene, substituted styrenes, acrylonitrile, acrylic acid esters, and unsaturated ketones such as methyl vinyl ketone and methyl isopropenyl ketone. Such conjugated diolefins which may be polymerized or copolymerized in aqueous emulsion using the soap type emulsifiers of the present invention include butadiene-1,3 and the homologues thereof such as isoprene, piperylene, dimethylbutadiene, methyl pentadiene and the like, as well as the 2-halogenobutadienes, particularly 2-chloro and 2-bromo butadiene-1,3. Furthermore it is intended that where the terms "conjugated diolefins" or "butadiene hydrocarbons" or "a butadiene" are employed hereinafter, these terms will include conjugated diolefin hydrocarbons, as well as the 2-chloro-butadiene-1,3 and the 2-bromo-butadiene-1,3 just mentioned. Compounds which may be polymerized by themselves or copolymerized with dienes, such as are outlined above, include, for example, styrene, para methyl styrene, para methoxy styrene, chloro styrenes, para bromo styrene, acrylonitrile, methacrylic acid nitrile, acrylic and methacrylic acid esters, such as methyl acrylate, methyl methacrylate, fumaric acid esters, such as ethyl fumarate and unsaturated ketones such as methyl vinyl ketone or methyl isopropenyl ketone.

As catalysts for the polymerization, there may be used many well known compounds which are capable of liberating oxygen under the reaction conditions applied, such as hydrogen peroxide, benzoyl peroxide, perborates and persulfates of ammonium or the alkali metals. It is also preferred to provide a mercaptan type polymerization modifier alone or in combination with an activator such as a soluble salt of hydrocyanic acid in the reaction mixture. The mercaptans which may be used are those which contain at least 7 carbon atoms in an aliphatic linkage, such as heptyl, octyl, decyl, dodecyl, octadecyl or benzyl mercaptan. The preferred modifier is a mixture of aliphatic mercaptans containing at least 50% dodecyl mercaptan, the remaining 50% being mercaptans containing 10-16 carbon atoms such as is obtainable from "Lorol" alcohol.

The following examples illustrate the present invention, but it is to be understood that this invention is not limited thereto:

*Example 1*

The selectively hydrogenated acid mixture prepared from beef tallow as described above was compared with a high grade acid mixture which had been obtained by the saponification of prime beef tallow and purified by subsequent distillation. The two acids were used in the same amounts in the synthesis of a butadiene-acrylonitrile copolymer containing approximately 26% of nitrile. The following recipe was employed, the parts being by weight:

| | Parts |
|---|---|
| Butadiene | 160 |
| Acrylonitrile | 56 |
| Water | 432 |
| Fatty acid | 9.86 |
| Sodium hydroxide | 1.07 |
| Mercaptan prepared from commercial lauryl alcohol | 1.08 |
| Potassium persulfate | 0.65 |

Each of the two emulsions was heated at 32° C. while mixing. After 18 hours the emulsion containing the selectively hydrogenated acid mixture was 85½% converted to a rubber-like copolymer, whereas the second emulsion prepared with the purified but not selectively hydrogenated tallow acids was only 75% converted to a rubbery copolymer after 19 hours.

*Example 2*

The selectively hydrogenated fatty acids from tallow prepared as above was compared with a commercial oleic acid in a pair of runs similar to the runs of Example 1. After 14 hours at 35° C. the emulsion prepared with the hydrogenated acid was 83½% converted to valuable rubbery polymers, whereas the emulsion prepared with oleic acid reached a conversion of only 77% after 23 hours at the same temperature.

*Example 3*

Runs were carried out in a pilot plant reactor of approximately 50 gallons capacity in which selectively hydrogenated acid mixture prepared as described above was again compared with commercial oleic acid in the synthesis of diolefin-acrylonitrile copolymer. Both runs were carried out at a temperature of 95° F. The run in which the selectively hydrogenated acid was used reached a 71% conversion to a rubber-like polymer in 11¾ hours, while the run using oleic acid required 15 hours to reach the same conversion. The product from the former run had a Mooney viscosity of 82 whereas the product of the latter run had a Mooney of 138, thereby definitely demonstrating that the selectively hydrogenated acid soap resulted in a softer and more processable rubber than that obtained when oleic acid soap was used. The respective polymers were compounded according to the following recipe:

| | Parts |
|---|---|
| Copolymer | 100 |
| Ozokerite wax | 1.5 |
| Coal tar softener | 4.0 |
| Wood rosin | 4.0 |
| MPC black | 45 |
| Stearic acid | 1.5 |
| Zinc oxide | 5 |
| Altax | 1.25 |
| DPG (diphenyl guanadine) | 0.25 |
| Sulfur | 1.5 |

The resultant compounds were then vulcanized at 287° F. for 45 minutes and evaluated. From the data set out below, it may be seen that the properties of the vulcanizate from the softer stock were as good as those of the tougher rubber.

| Fatty Acid Used | Tensile Strength | Elongation |
|---|---|---|
| | Lbs./sq. in. | Per cent |
| Selectively Hydrogenated Tallow Acids | 3,750 | 740 |
| Oleic Acid | 3,750 | 670 |

*Example 4*

Although the selectively hydrogenated tallow acid mixture contained 50% of combined stearic and palmitic acids, the solubility of the sodium salts of the mixed acids are such as to allow their use as emulsifier for polymerizations carried out at low temperatures. In an experiment similar to that of Example 1, except that 0.003% (based on reactants) of sodium cyanide was used as promoter, a reaction temperature of 25° C. was used. A yield of excellent rubber-like polymer was obtained after 14¾ hours which was equivalent to 82% of theory.

*Example 5*

Use of the selectively hydrogenated tallow acid mixture is also advantageous for other emulsions than those of the diene-acrylonitrile type. It has also been found advantageous in the preparation of Buna S (butadiene-styrene copolymers). The following data are typical of the good results obtained:

The following charge was used in making an experimental batch of Buna S:

| | Parts |
|---|---|
| Butadiene | 150 |
| Styrene | 50 |
| Commercial chip soap | 12 |
| Water | 400 |
| Commercial lauryl mercaptan | 1.0 |
| Potassium persulfate | 0.6 |

This mixture was heated at 45° C. for 16 hours while mixing. A conversion to rubber-like polymer of 75% of theory was obtained. Simultaneously a run was made which was a duplicate of the above except that 11 grams of anhydrous sodium salt of the selectively hydrogenated tallow acid mixture was used instead of the commercial soap chips. A yield of 84% was obtained in this case. Duplicates of these two runs were made in which 0.003% of sodium cyanide as promoter was added to each run. That with the hydrogenated acid reached a conversion of 96%, whereas that with the commercial soap was only 70½% converted in the same time.

The chip soap is a commercial soap prepared largely from tallow.

The runs cited in Example 5 not only illustrate the advantages of a selectively hydrogenated acid but also its advantageous aspects when minute quantities of other ingredients are employed.

The foregoing description contains a limited number of embodiments of the present invention. It will be understood, however, that the latter is not limited to the specific details disclosed since numerous variations are possible without departing from the scope of the following claims.

What we claim and desire to secure by Letters Patent is:

1. The process of producing emulsion polymerizates of conjugated diolefins having 4 to 6 carbon atoms per molecule which comprises effecting the polymerization thereof in aqueous emulsion in the presence of water-soluble soaps of selectively hydrogenated tallow acids as the emulsifying agent.

2. The process of producing emulsion polymerizates of conjugated diolefins having 4 to 6 carbon atoms per molecule which comprises effecting the polymerization thereof in aqueous emulsion in the presence of water-soluble soaps of a mixture of fatty acids consisting of 0.5% of myristoleic acid, 3% myristic acid, 7.0% of palmitoleic acid, 26.4% of palmitic acid; 39% of oleic acid, 23.6% of stearic acid and less than 0.5% of linoleic acid as the emulsifying agent.

3. The process of producing synthetic rubber like materials which comprises effecting the polymerization of a mixture of a major proportion of conjugated butadiene and a minor proportion of acrylonitrile in a from neutral to an alkaline aqueous medium using as the emulsifying agent a water-soluble soap of selectively hydrogenated tallow acids having not more than 0.5% of linoleic acid and a titre below 45° C.

4. The process of producing synthetic rubber like materials which comprises effecting the polymerization of a mixture of a major proportion of conjugated butadiene and a minor proportion of acrylonitrile in a from neutral to an alkaline aqueous medium using as the emulsifying agent 1 to 4% (by weight of aqueous medium) of a water-soluble soap of a mixture of fatty acids consisting of 0.5% of myristoleic acid, 3% myristic acid, 7.0% of palmitoleic acid, 26.4% of palmitic acid; 39% of oleic acid, 23.6% of stearic acid and less than 0.5% of linoleic acid.

5. The process of producing synthetic rubber like materials which comprises effecting the polymerization of a mixture of a major proportion of a conjugated butadiene having 4 to 6 carbon atoms per molecule and a minor proportion of styrene in a from neutral to an alkaline aqueous medium using as the emulsifying agent a water-soluble soap of selectively hydrogenated tallow acids having not more than 0.5 percent of linoleic acid and a titer below 45° C.

6. The process of producing synthetic rubber like materials which comprises effecting the polymerization of a mixture of a major proportion of a conjugated butadiene having 4 to 6 carbon atoms per molecule and a minor proportion of styrene in a from neutral to an alkaline aqueous medium using as the emulsifying agent a water-soluble soap of a mixture of fatty acids consisting of 0.5% of myristoleic acid, 3% myristic acid, 7.0% of palmitoleic acid, 26.4% of palmitic acid; 39% of oleic acid, 23.6% of stearic acid and less than 0.5% of linoleic acid.

7. The process of producing synthetic rubber-like copolymers of a conjugated diolefin having 4 to 6 carbon atoms per molecule with an ethylenically unsaturated compound copolymerizable therewith, which process comprises effecting the polymerization thereof in aqueous emulsion in the presence of water-soluble soaps of a mixture of selectively hydrogenated tallow acids containing added lauric acid, the acid mixture having a titer below 45° C. and containing not more than 0.5 percent of linoleic acid and not more than 30 percent combined total of lauric plus myristic acid.

8. The process of producing synthetic rubber-like copolymers of a major proportion of a conjugated diolefin having 4 to 6 carbon atoms per molecule and a minor proportion of acrylonitrile, which process comprises effecting the polymerization thereof in aqueous emulsion in the presence of water-soluble soaps of a mixture of selectively hydrogenated tallow acids containing lauric acid added thereto, the resulting mixture having a titer below 45° C. and containing not more than 30 percent combined total of lauric plus myristic acid and not more than 0.5 percent of linoleic acid.

9. The process of producing synthetic rubber-like copolymers of a conjugated diolefin having 4 to 6 carbon atoms per molecule with an ethylenically unsaturated compound copolymerizable therewith, which process comprises effecting the polymerization thereof in aqueous emulsion in the presence of water-soluble soaps of a mixture of fatty acids consisting essentially of 0 to 1 per cent of myristoleic acid, 0 to 4 percent of myristic acid, 4 to 10 percent of palmitoleic acid, 20 to 35 percent of palmitic acid, 35 to 45 percent of oleic acid, 0 to 0.5 percent of linoleic acid and 20 to 30 percent of stearic acid; the acid mixture having a titer below 45° C.

10. A process according to claim 9 wherein the fatty acid mixture contains lauric acid added thereto in an amount to raise the combined total of lauric plus myristic acid in the mixture to a proportion not exceeding 30 percent.

BYRON M. VANDERBILT.
JOHN D. HETCHLER.

REFERENCES CITED

The following references are of record in the file of this patent:

UNITED STATES PATENTS

| Number | Name | Date |
|---|---|---|
| 1,898,522 | Bock | Feb. 21, 1933 |
| 2,091,886 | Schanzle | Aug. 31, 1937 |
| 2,363,694 | Ross | Nov. 28, 1944 |
| 2,366,325 | Fryling | Jan. 2, 1945 |
| 2,422,371 | Schoenfeld | June 17, 1947 |